(12) United States Patent
Driesen et al.

(10) Patent No.: US 7,702,037 B2
(45) Date of Patent: Apr. 20, 2010

(54) METHOD AND APPARATUS FOR ESTIMATING DC OFFSET IN AN ORTHOGONAL FREQUENCY DIVISION MULTIPLEXING SYSTEM

(75) Inventors: Bas Driesen, Dongen (NL); Joseph H. Havens, Pinckney, MI (US); Robert John Kopmeiners, Hengelo (NL)

(73) Assignee: Agere Systems Inc., Allentown, PA (US)

( * ) Notice: Subject to any disclaimer, the term of this patent is extended or adjusted under 35 U.S.C. 154(b) by 1443 days.

(21) Appl. No.: 10/918,223

(22) Filed: Aug. 13, 2004

(65) Prior Publication Data

US 2005/0111525 A1 May 26, 2005

Related U.S. Application Data

(60) Provisional application No. 60/497,813, filed on Aug. 26, 2003.

(51) Int. Cl.
*H04L 25/06* (2006.01)

(52) U.S. Cl. ...................................... 375/319

(58) Field of Classification Search ................. 375/316, 375/319, 338, 339, 346; 455/63.1, 114.2, 455/278.1, 296
See application file for complete search history.

(56) References Cited

U.S. PATENT DOCUMENTS

| 7,123,670 | B2* | 10/2006 | Gilbert et al. | 375/344 |
| 7,167,530 | B2* | 1/2007 | Koomullil et al. | 375/329 |
| 2004/0071118 | A1* | 4/2004 | Dabak et al. | 370/335 |

* cited by examiner

*Primary Examiner*—Sam K Ahn
(74) *Attorney, Agent, or Firm*—Ryan, Mason & Lewis, LLP

(57) ABSTRACT

Methods and apparatus are disclosed for DC offset estimation and for DC offset compensation that collectively reduce or eliminate the distortion of subcarriers due to DC offset in an OFDM receiver. The DC offset estimation is obtained by subtracting a sum of time domain samples of an OFDM symbol for two consecutive OFDM symbols or subtracting a known transmitted OFDM symbol and a frequency domain representation of a received version of the known OFDM symbol (at least one of which is adjusted to compensate for channel distortion). The DC offset compensation is accomplished by removing the estimated DC offset from the received signal. The DC estimation process and the DC compensation process can be connected in disclosed feed-forward or feedback configurations.

28 Claims, 4 Drawing Sheets

METHOD AND APPARATUS FOR ESTIMATING DC OFFSET IN AN ORTHOGONAL FREQUENCY DIVISION MULTIPLEXING SYSTEM

CROSS REFERENCE TO RELATED APPLICATIONS

This application claims the benefit of U.S. Provisional Application No. 60/497,813, filed Aug. 26, 2003, incorporated by reference herein.

FIELD OF THE INVENTION

The present invention relates generally to Orthogonal Frequency Division Multiplexing (OFDM) systems, and more particularly, to methods and apparatus for estimating and compensating for the DC offset in an OFDM receiver.

BACKGROUND OF THE INVENTION

Most existing Wireless Local Area Network (WLAN) systems based upon OFDM modulation techniques comply with the IEEE 802.11a/g standard (see, IEEE Std 802.11a-1999, "Part 11: Wireless LAN Medium Access Control (MAC) and Physical Layer (PHY) Specification: High-speed Physical Layer in the 5 GHz Band"). In order to support evolving applications, such as multiple high-definition television channels, WLAN systems must be able to support ever increasing data rates. Accordingly, next generation WLAN systems should provide increased robustness and capacity.

The receiver of an OFDM system can be based on a number of RF architectures, including the heterodyne, homodyne zero-IF and homodyne low-IF architectures. A heterodyne receiver utilizes a two-step process to regenerate the original baseband signal. The homodyne zero-IF design utilizes a single step process to create the baseband signal. The homodyne low-IF method utilizes a basic two-step process, but the intermediate frequency signal created after step one is at a very low frequency and is treated as a type of baseband signal.

It is generally recognized that the best choice for an efficient, integrated receiver is the homodyne zero-IF architecture. While all of the architectures described above suffer from some degree of DC offset at the receiver, the homodyne zero-IF architecture generates the most DC offset (in addition to other impairments). The OFDM modulation technique, however, is especially sensitive to a DC offset in the received signal. The sensitivity is a function of the data rate, which is itself a function of the constellation and coding over the subcarriers. While there are a number of design techniques that can be utilized to mitigate or reduce the effects of DC offset (e.g., DC offset calibration or AC coupling), it remains difficult to meet the requirements of the highest data rate OFDM modulation specification (64 QAM at 54 Mbps).

A need therefore exists for a method and system to estimate the DC offset in an OFDM receiver. A further need exists for methods and systems to compensate for such DC offset.

SUMMARY OF THE INVENTION

Generally, methods and apparatus are disclosed for DC offset estimation and for DC offset compensation that collectively reduce or eliminate the distortion of subcarriers due to DC offset in an OFDM receiver. The DC offset estimation is accomplished by subtracting a sum of time domain samples of an OFDM symbol for two consecutive OFDM symbols or subtracting a known transmitted OFDM symbol and a frequency domain representation of a received version of the known OFDM symbol (at least one of which is adjusted to compensate for channel distortion).

The signal can be a measured complex value, obtained by summation of the time-domain samples of a fast Fourier transform (FFT)-symbol, providing an estimate of subcarrier 0, or a measured complex value for one or more selected subcarriers after the FFT. The corresponding data values can be expected data values associated with one or more training symbols or detected data values received at the receiver. When the signal is a measured complex value, obtained by summation of the time-domain samples of one FFT-symbol (providing an estimate of subcarrier 0), the expected signal would be an absence of data values. In order to address the carrier leakage in such a subcarrier 0 implementation, two consecutive symbols can be subtracted to account for carrier leakage or an estimate of carrier leakage associated with a transmitter can be removed from the corresponding complex value of subcarrier 0.

The DC offset compensation is accomplished by removing the estimated DC offset distortion from the received signal. The DC estimation process and the DC compensation process can be connected in disclosed feed-forward or feedback configurations.

A more complete understanding of the present invention, as well as further features and advantages of the present invention, will be obtained by reference to the following detailed description and drawings.

DETAILED DESCRIPTION

The signal received by an OFDM receiver consists of the original transmitted signal plus the distortion caused by DC offset and other impairments. The present invention recognizes that the DC offset can be estimated by identifying the distortion of known signals (e.g., the other subcarriers) and removing the known distortion from the received signal such that an estimate of the DC offset can be obtained. Once the known signals are removed, however, the noise that accumulated in the system will still be present. Hence, the difference between the received signal and the reconstructed signal is the receiver DC offset distortion plus the noise. The noise can be "averaged out" using well known techniques and the receiver DC offset distortion can be estimated. Thus, assuming that all the other impairments are known or irrelevant (i.e., too small to impact the received signal), it is possible to reconstruct the received signal based on the demodulated data.

DC Offset in OFDM Systems

The effects of DC offset at the receiver are principally due to the orthogonality requirement of OFDM. Essentially, the DC component "spills over" into the other subcarriers during the fast fourier transform (FFT) process when it is not exactly orthogonal to the OFDM spectrum due to frequency offset between transmitter and receiver. The IEEE 802.11a standard allows a frequency offset of only 50 ppm in total (40 ppm for the IEEE 802.11g standard).

Figure 1:
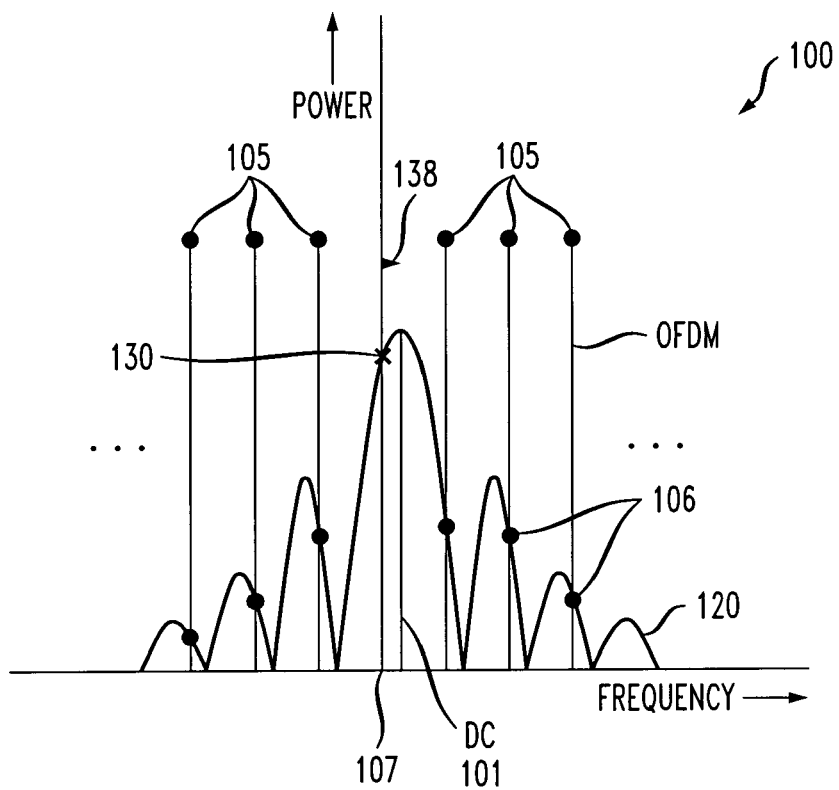
FIG. 1 illustrates a spectrum of an OFDM receiver and a subcarrier distortion due to a DC offset.

FIG. 1 illustrates the receiver OFDM spectrum and the subcarrier distortion due to the DC offset. In addition to the DC term (subcarrier 0), the IEEE 802.11a/g standard defines the use of a total of 52 subcarriers. Since the transmitter and receiver are not synchronized in frequency, a small frequency offset exists between the transmitter and receiver spectra. Therefore, the receiver DC component 101 is not added exactly in the middle of the OFDM symbol, but is offset from its original position 107 in relation to the other subcarriers, as shown in FIG. 1 (not all subcarriers are shown).

In FIG. 1, the spikes 105 indicate the subcarriers of a received OFDM symbol. (Normally, the amplitude per subcarrier varies due to channel and modulation, but this is not shown for the sake of clarity.) When an OFDM signal 120 is received with an arbitrary frequency offset 138, the receiver DC offset is added to the OFDM signal 120 at a non-orthogonal frequency. The result is distortion to all subcarriers 105 of an OFDM symbol. After the time-to-frequency transformation, the windowed DC component causes a sinc-like function in the frequency domain. Due to the small frequency offset 138, the nulls of the sinc-function are not exactly aligned with the subcarrier spacing (i.e., not orthogonal) and the DC offset causes distortion to the other subcarriers 106. This reduces the data rates at which the system can satisfactorily operate.

Figure 2:
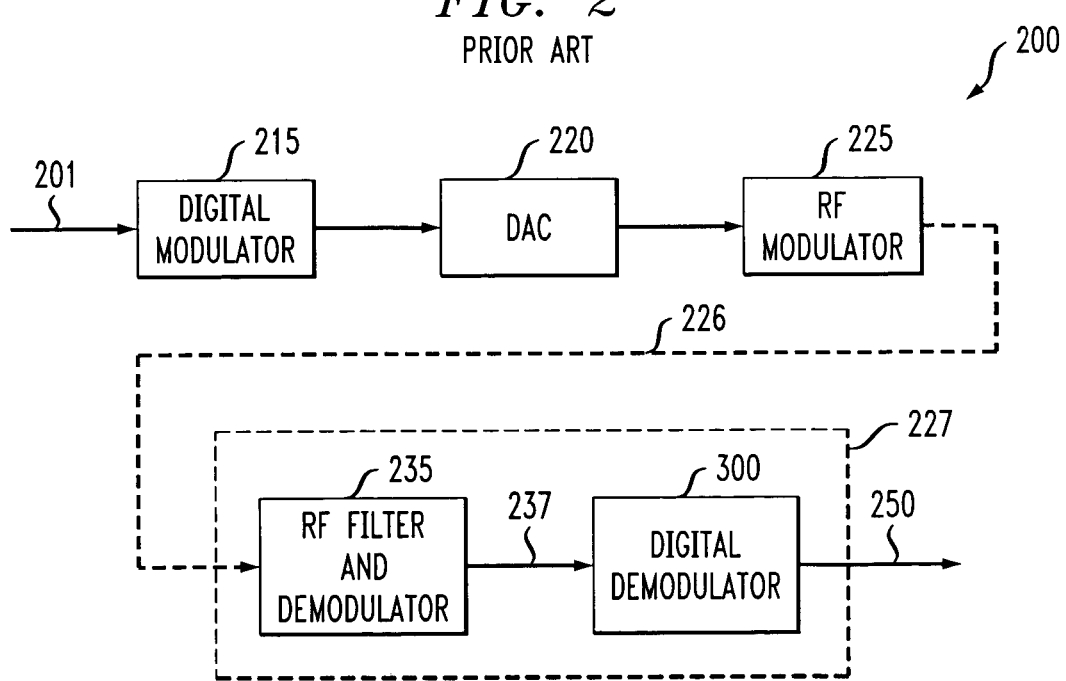
FIG. 2 is a schematic block diagram of an exemplary conventional IEEE 802.11a/g system.

FIG. 2 is a schematic block diagram of an exemplary IEEE 802.11 a/g system 200. As shown in FIG. 2, a source baseband signal 201 is modulated in the digital domain by modulator 215 and, after digital-to-analog conversion (block 220), the signal is upconverted to RF frequencies in the analog domain by RF modulator 225 and transmitted. At an OFDM receiver 227, the signal 226 is filtered to extract the desired frequency band and downconverted to a baseband signal by an analog RF filter and demodulator 235. The baseband signal 237 is then converted to digital and demodulated (block 300) in the digital domain to recreate the original data stream 250.

Figure 3:
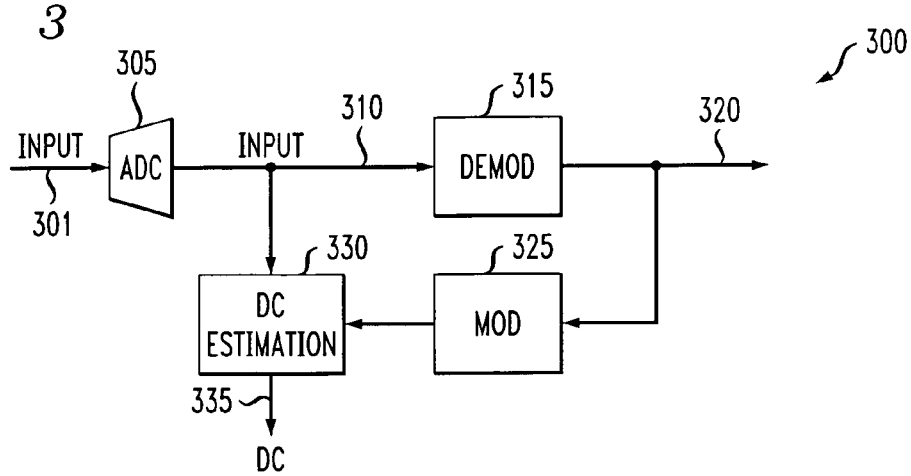
FIG. 3 is a schematic block diagram of an OFDM receiver demodulator of FIG. 2 incorporating DC estimation based on subcarriers with known or detected modulation.

FIG. 3 is a schematic block diagram of an OFDM receiver demodulator 300 incorporating DC estimation based on subcarriers with known or detected modulation. Generally, the OFDM receiver demodulator 300 performs DC offset estimation using a selected set of subcarriers, as discussed further below in conjunction with FIG. 4, while a variation of the invention discussed below in conjunction with FIG. 5 uses only subcarrier 0. As shown in FIG. 3, the received analog input signal 301 is converted to a digital input signal 310 by analog-to-digital converter 305 and demodulated by demodulator 315. After demodulation, the error free data 320 is modulated by modulator 325 and compared to the digital input signal 310 by a DC estimator 330 to derive a DC offset estimate 335. One drawback to this technique is the need to "re-modulate" the data and the latency involved with that process.

FFT-Based DC Estimation

DC estimation may be easier for specific subcarriers of the OFDM modulated signal, where the data (e.g., training sequences, pilot signals, and subcarrier 0) is known a priori or is easily obtainable. If a complete demodulation path is not required for obtaining this data, the DC offset can be estimated immediately following the fast fourier transformation of the known subcarriers, i.e., the known data is removed from all of the subcarriers. The remaining signal is the noise and DC offset distortion. If the noise is "averaged out," the result will be an estimate of the DC offset distortion.

Figure 4:
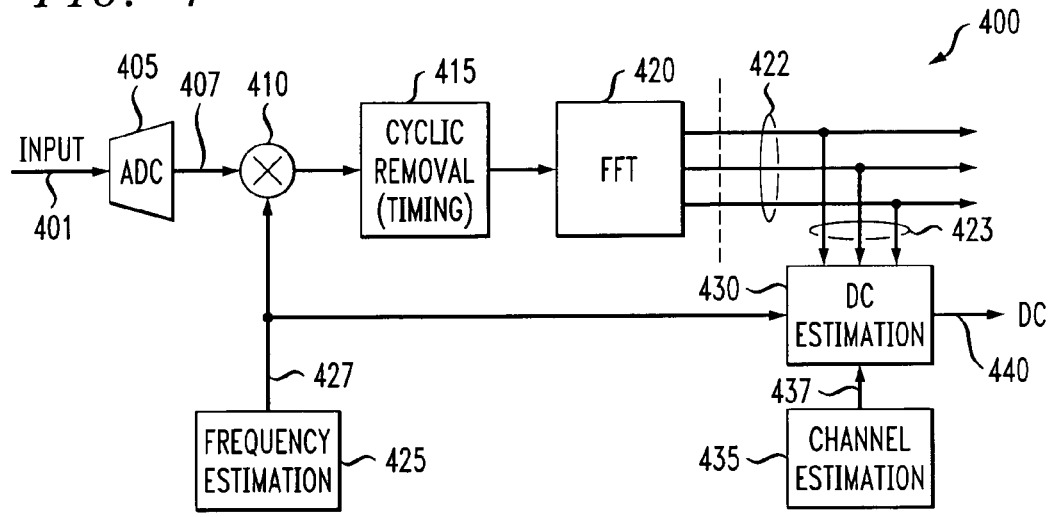
FIG. 4 is a schematic block diagram of an OFDM receiver demodulator incorporating an exemplary DC estimation block based on subcarriers with known or detected modulation.

FIG. 4 is a schematic block diagram of an OFDM receiver demodulator 400 incorporating an exemplary DC estimation block based on subcarriers with known or detected modulation. If the required parameter estimates (including timing, frequency offset, and channel) are available with sufficient accuracy, the digital input can be corrected for frequency offset. As shown in FIG. 4, an analog-to-digital conversion is first performed on the input signal 401 by analog-to-digital converter 405 to generate digital input 407. The digital input 407 is then multiplied (block 410) by a frequency estimate 427 generated by a frequency estimation block 425. It is noted that the multiplication is a complex multiplication with the complex conjugate of the LO offset estimation (phasor).

The appropriate (estimated) timing can then be applied by cyclic removal block 415 to derive the required 64 time samples for input to the FFT block 420. Some (or all) of the subcarriers 422, which contain information on the DC offset, are selected and passed to the DC estimation block 430. The DC offset distortion is then estimated by utilizing channel information 437 (derived by the channel estimation block 435) and compensating for the frequency offset 427. Generally, the DC offset distortion is the complex value of each selected subcarrier 423 with the corresponding expected or detected data removed, assuming appropriate compensation of the channel. Also, data and known distortion on the selected subcarriers 423 needs to be removed (e.g., the carrier leakage on subcarrier 0 and known BPSK symbols for pilots and training symbols) before the receiver DC offset estimate 440 can be calculated. The pilots and training are known or robustly detected (e.g., BPSK). If subcarrier 0 is employed, then carrier leakage requires a separate estimation or a differential implementation, as discussed further below in the section entitled "Differential Detection." Since some parameter estimates are not available before the DC is removed, and since the first few subcarriers near subcarrier 0 have the largest receiver DC distortion, the usage of subcarriers at higher frequencies may not be of value for the practical situation of an IEEE 802.11a/g receiver.

Subcarrier 0-Based DC Estimation

Figure 5:
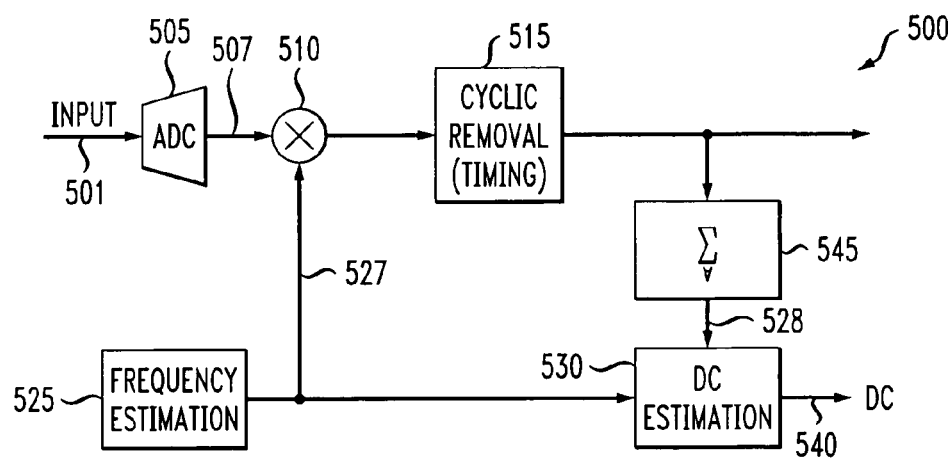
FIG. 5 is a schematic block diagram of an OFDM receiver demodulator incorporating an exemplary DC estimation block utilizing only subcarrier 0.

FIG. 5 is a schematic block diagram of an OFDM receiver demodulator 500 incorporating an exemplary DC estimation block utilizing only subcarrier 0. Although basically the same technique is applied in FIG. 5 as in the FFT-based technique (as illustrated in FIG. 4), the channel estimation step 435 is skipped and only the use of subcarrier 0 from the FFT is needed. As shown in FIG. 5, an analog-to-digital conversion is first performed on the input signal 501 by analog-to-digital converter 505 to generate digital input 507. The digital input 507 is then multiplied (block 510) by a frequency estimate 527 (generated by the frequency estimation block 525). The appropriate (estimated) timing can be then applied by cyclic removal block 515 to derive the required 64 time samples. The FFT for subcarrier 0 is obtained by adding the 64 input samples of the FFT (performed by the summation block 545). Due to the orthogonality of the OFDM system, the sum of all the subcarriers should be zero (assuming no DC offset). Thus, the summation of all of the subcarriers indicates the DC offset distortion (assuming no carrier leakage at the transmitter). Given the equation for the signal, s(n), discussed below, the DC offset generated at the receiver, $DC_{RX}$, can be obtained, using the summed value 528 and known or assumed values for the carrier leakage, $DC_{TX}$. If the carrier leakage is not known, the carrier leakage can be addressed using a differential implementation, as discussed further below in the section entitled "Differential Detection," to eliminate the carrier leakage.

The DC estimate 540 is then computed by the DC estimation block 530 based on the frequency estimate 527 and the summation 528. This simplified subcarrier 0-based DC estimation technique does not require the time consuming FFT process, results in less processing latency and does not require the channel estimation step.

Figure 6:
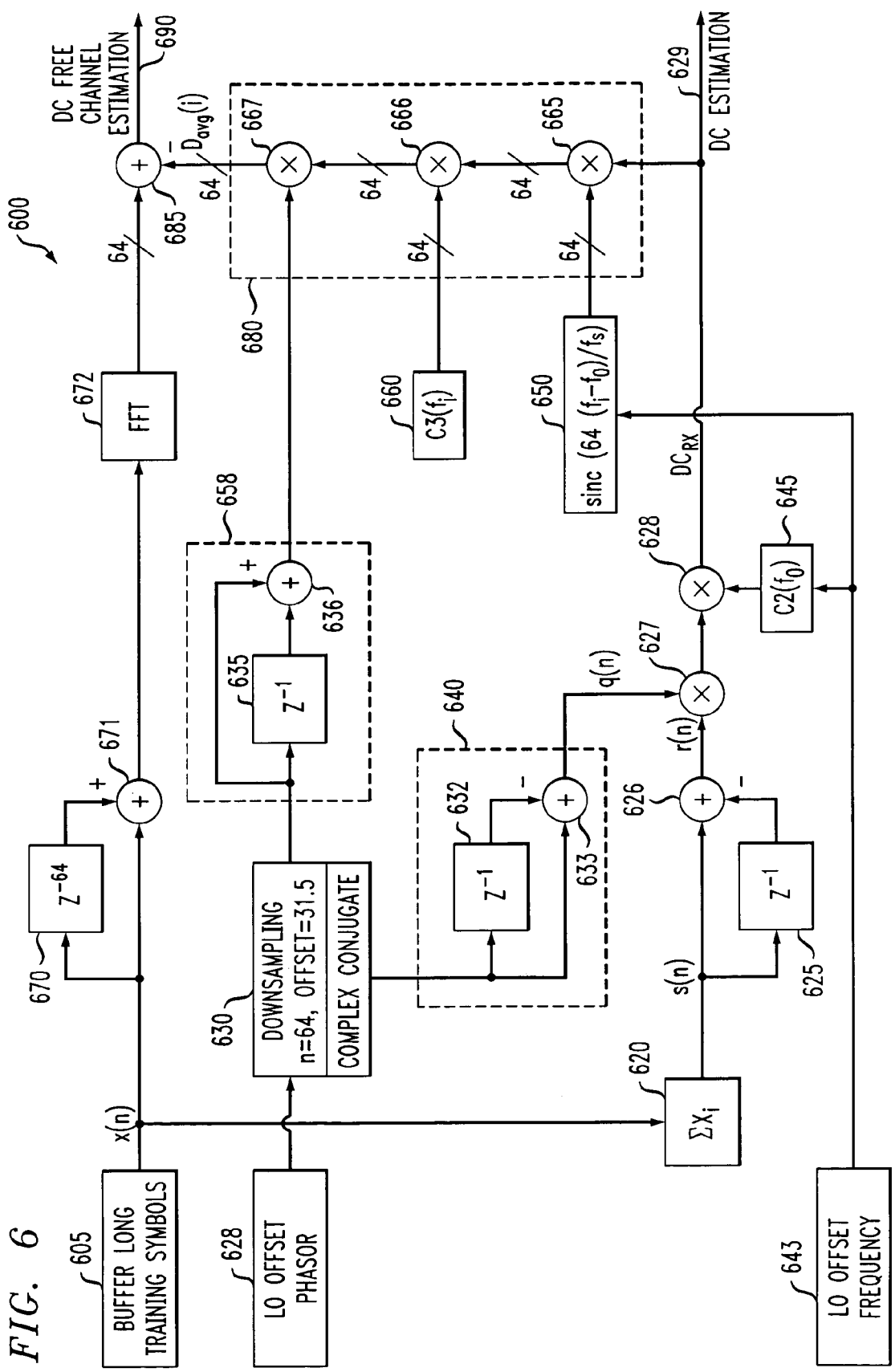
FIG. 6 is a schematic block diagram of an exemplary OFDM receiver incorporating the features of the present invention for performing DC estimation and compensation of the channel estimation.

FIG. 6 is a schematic block diagram of an exemplary OFDM receiver 600 incorporating the features of the present invention for performing DC estimation and compensation for the long training symbols, i.e., the channel estimation. This implementation attempts to determine the estimated value of the signal, s(n), identified with an "x" 130 in FIG. 1, in order to estimate the DC offset. The signal s(n) shown in FIG. 1 and as discussed further below in conjunction with FIG. 6 may be referred to as DC offset distortion at subcarrier 0. The DC offset is estimated based on the two local oscillator (LO) offset-corrected long training symbols that are components of an OFDM preamble. Since the OFDM spectrum may contain severe carrier leakage, the DC estimation based on subcarrier 0 of one OFDM symbol may be distorted and not useful. Therefore, the difference of two successive DC estimations is used, canceling out the constant carrier leakage value at subcarrier 0, but retaining some value representing the receiver DC offset (signal r(n) in FIG. 6).

As shown in FIG. 6, the sum of all 64 input time domain samples of the FFT is computed for the long training symbols x(n) (from the long training symbol buffer 605) by the summation unit 620 to generate a signal, s(n). The power value of s(n) is identified with an "x" in FIG. 1. The signal s(n) is fed through a delay unit 625 and subtracted (block 626) from the current value of s(n) to generate r(n) (as described above). Both of these signals, s(n) and r(n), vary with time, i.e., with every symbol due to the LO (frequency) offset compensation.

To calculate the true DC level at the input (i.e., the output of the analog-to-digital converters), the output r(n) is processed to compensate for the Local Oscillator offset compensation (the difference between the transmitter and receiver local oscillators). To accomplish this, the LO offset phasor 628 is down sampled by a factor of 64 (block 630) and complex conjugated, the difference of two consecutive phasor values is calculated (block 640), and the result q(n) is multiplied (block 627) with r(n) to produce t(n). The LO offset frequency 643 is then processed with a compensation factor 645 and multiplied (block 628) with t(n). The result is the receiver DC offset estimate $DC_{RX}$ 629. It should be noted that block 640 comprises a delay unit 632 and subtraction unit 633 that operate in a manner similar to that of delay unit 625 and subtraction unit 626.

The remainder of the circuitry in FIG. 6 is designed to compensate for the DC offset $DC_{RX}$ 629, local oscillator offset LOO, and the effects of subcarrier rotation. The computed receiver DC offset estimate $DC_{RX}$ 629 is passed through the compensation processing block 680 to calculate the DC contribution in the frequency domain (Davg(i)). Block 650 determines the DC power contribution to each subcarrier (sinc shape) as a function of the LO offset frequency 643, i.e. the circles 106 in FIG. 1. Block 660 is a compensation factor to compensate for the effect of the sub carriers rotation. The downsampled local oscillator offset phasor is averaged over two samples (block 658) to produce the local oscillator offset used by block 680 (block 680 comprises multiplier units 665-667).

The buffer long training symbols 605 are also delayed (block 670) and summed (block 671) to derive the required 64 time samples for input to the FFT block 672. The DC contribution in the frequency domain (Davg(i)) is then added (block 685) to the output of the fast fourier transform (performed by FFT 672) to generate the DC free channel estimation 690. It is noted that the DC free channel estimation 690 is obtained after removing the training data symbols per subcarrier. The removal of the DC offset from each subcarrier should take into account the fact that the Long Training Symbols are averaged over two DC estimations (done by means of block 658).

DC Offset Compensation Process

Figure 7:
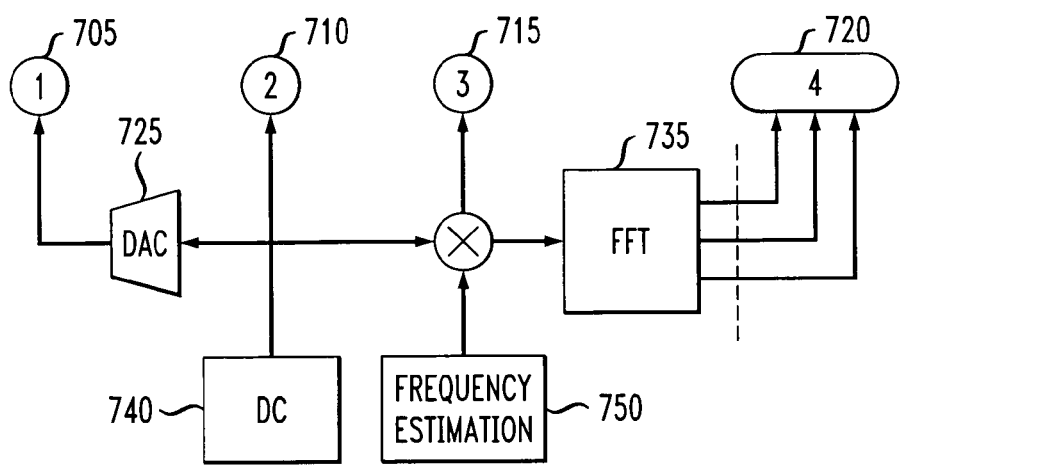
FIG. 7 is a schematic block diagram of an exemplary OFDM receiver illustrating the entry points for DC compensation.

The DC offset estimate generated from the processes described above is used to compensate the signal for further demodulation. It is trivial to compensate the DC offset at the entry point of the digitized signal; however, other entry points may be more appropriate, depending on the application and associated limitations. FIG. 7 is a schematic block diagram of an exemplary OFDM receiver 700 illustrating the entry points for DC compensation. As illustrated in FIG. 7, the following entry points are identified for compensation: 1) analog input 705, 2) digitized input 710, 3) after frequency offset compensation 715, and 4) after Fourier transform 720. It is noted that the DC term is split in three directions in FIG. 7.

Compensation in the analog domain (Entry Point 1 705) may assist the required DC reduction in the RF baseband signal path; the efficient range of the analog-to-digital converters (ADCs) is therefore not affected. Compensation of the digitized input signal (Entry Point 2 710) requires the least processing. Compensation after frequency offset compensation (Entry Point 3 715) requires the DC component to be modulated with the same coherent phasor used for frequency offset compensation. This may be useful for some frequency offset compensated signals that are stored. Due to latency considerations, it may be appropriate to perform the DC compensation after the FFT 735 (Entry Point 4 720). For that purpose, the frequency offset compensated DC passes a FFT function before each individual subcarrier is compensated. A good example of this is the DC offset compensation in FIG. 6, where the FFT function is simplified.

DC Offset Estimation and Compensation Configurations

Figure 8:
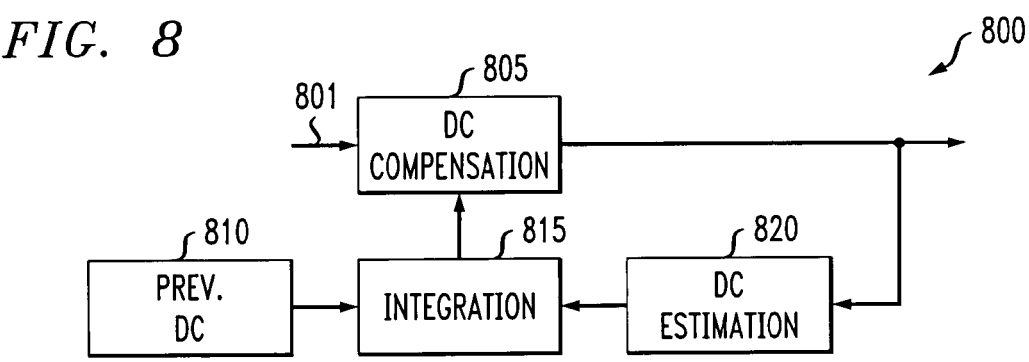
FIG. 8 is a schematic block diagram of a feedback DC offset cancellation system.
Figure 9:
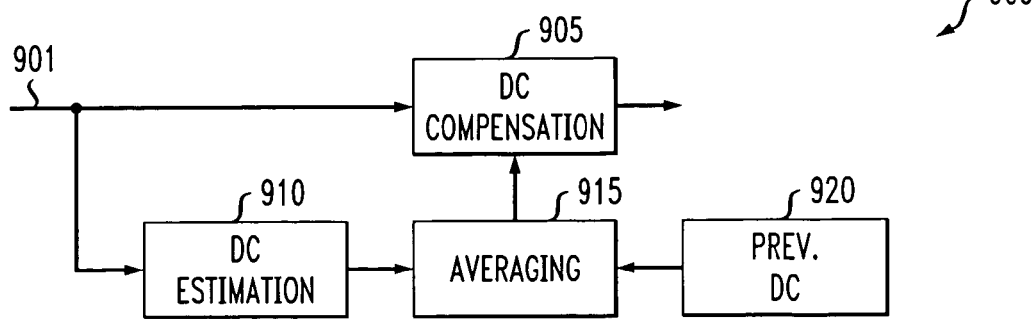
FIG. 9 is a schematic block diagram of a feed-forward DC offset cancellation system.

The DC estimation process and the DC compensation process can be connected in feed-forward or feedback configurations. FIG. 8 is a schematic block diagram of a feedback DC offset cancellation system 800 and FIG. 9 is a schematic block diagram of a feed-forward DC offset cancellation system 900. In both configurations, the input signal 801, 901 is fed to the DC compensation block 805, 905. In the feedback configuration, the DC estimation 820 is performed following the DC compensation 805 of the input signal 801. In the feed-forward configuration, the DC estimation 910 is performed on the input signal 901, i.e. prior to the DC compensation 905.

The configurations do have some limitations. To improve the DC estimate, an integration process 815 or averaging algorithm 915 may be applied over multiple symbols. The resulting latency and required accuracy should be considered in determining which, if any, integration or averaging process is performed. If previous DC estimates 810, 920 are available (e.g. from the training, or from a previous packet), they may be the start value of the integrator 815 or averaging block 915, respectively.

In the feedback configuration, the signal is compensated based on previous DC estimates 820 before the new DC estimation process starts. In this manner, the remaining error can be corrected. For this approach, the entry points for compensation should be earlier in the chain than the input for the DC estimation. For instance, it is not logical to use DC estimation based on subcarrier 0 (normally done before the FFT) and compensation after the FFT in a feedback manner. Notice that analog compensation can only be done in feedback compensation, although the update rate may be very low (only once per packet). Since the DC estimation process likely runs in parallel with the data path, for a feed-forward implementation, the entry points for compensation should be later than the input for the DC estimation (unless the data-path is delayed accordingly for example). It should also be noted that the feed-forward scheme cannot correct the remaining error after compensation.

As indicated earlier, the exemplary embodiment of FIG. 6 is based on the information of sub carrier 0 and the compensation is performed after the FFT (in this case, taking into account the averaging of two long training symbols). The configuration is a feed-forward type, without averaging and without pre-knowledge of the DC component.

Differential Detection

As previously indicated, the basic DC estimation process uses the information of known data at the sub carriers and can be based on the information of a single symbol using subcarrier 0 (the DC term), if it is empty. The OFDM standard, however, allows a significant carrier leakage, resulting in a constant DC term in the middle of the OFDM spectrum. The carrier leakage should either be known to remove it from the calculations or an algorithm should be used that eliminates the constant carrier leakage term. An exemplary embodiment of such an algorithm is shown in FIG. 6 where the algorithm is differential detection over two consecutive symbols.

Reduced Complexity

While the complexity of the calculation for the DC offset estimate based on the subcarrier 0 value can be reduced, the straightforward calculation results in complex equations:

$$s(n) = DC_{RX} e^{-j2\pi \frac{f_{LO}}{f_s}\left(\frac{N_s-1}{2}+N_g+nN_s\right)} \frac{\sin\left((N_s-N_g)\pi\frac{f_{LO}}{f_s}\right)}{\sin\left(\pi\frac{f_{LO}}{f_s}\right)} + (N_s-N_g)DC_{TX};$$

and $$r(n) = (N_s-N_g) \cdot DC_{RX} \operatorname{sinc}\left((N_s-N_g)\pi\frac{f_{LO}}{f_s}\right)$$
$$\left(e^{-j2\pi\frac{f_{LO}}{f_s}\left(\frac{(N_s-N_g-1)}{2}+N_g+nN_s\right)} - e^{-j2\pi\frac{f_{LO}}{f_s}\left(\frac{(N_s-N_g-1)}{2}+N_g+(n-1)N_s\right)}\right),$$

where:
- s(n)=Value used for single symbol DC estimation
- r(n)=Value used for differential, dual symbol DC estimation
- $DC_{RX}$=DC generated at the receiver
- $DC_{TX}$=DC generated at the transmitter (carrier leakage)
- $f_{LO}$=frequency offset between transmitter and receiver
- $F_s$=sample frequency (20 MHz)
- n=symbol number
- $N_g$=guard time in samples
- $N_s$=symbol period in samples.

A complex division should be performed to derive the desired value $DC_{RX}$. The present invention converts these complex calculations to real multiplications factors (such as from a look-up table) together with a complex multiplication of a term directly derived from the phasor (the signal that is used to compensate for frequency offset). This is the signal q(n) in FIG. 6 prior to multiplication with r(n). The signal q(n) is the difference of p(n) and p(n−1), where p(n) is the down-sampled (one value per symbol) and phase-corrected value of the complex conjugated phasor. For a single symbol DC estimation, this signal p(n) should be applied to s(n). The phase-shift is established by taking the right (possibly interpolated) timing moment for downsampling. In some implementations, the sampling moment is truncated to a discrete sample moment.

It is to be understood that the embodiments and variations shown and described herein are merely illustrative of the principles of this invention and that various modifications may be implemented by those skilled in the art without departing from the scope and spirit of the invention.

We claim:

1. A method for estimating a direct current (DC) offset distortion of a received signal in a receiver, comprising the steps of:
    computing a sum of time domain frequency-compensated samples for each of two consecutive Orthogonal Frequency Division Multiplexing (OFDM) symbols received by said receiver;
    subtracting one of said sums of time domain frequency-compensated samples from another of said sums of time domain frequency-compensated samples; and
    obtaining said DC offset estimate from said subtracting step.

2. The method of claim 1, further comprising the step of removing said DC offset estimate from said received signal.

3. The method of claim 1, wherein said sums of time domain frequency-compensated samples for each of two consecutive OFDM symbols would be expected to be approximately zero in an absence of said DC offset distortion and transmitter carrier leakage.

4. The method of claim 3, wherein said subtracting step removes said transmitter carrier leakage contribution from said sums of time domain frequency-compensated samples.

5. The method of claim 1, wherein said computing step removes contributions from signal subcarriers.

6. The method of claim 5, wherein said signal subcarriers have a time-average of zero across a plurality of samples within a given OFDM symbol.

7. The method of claim 1, wherein said computing step provides an indication of a transmitter carrier leakage and a receiver DC offset.

8. The method of claim 1, wherein said subtracting step provides an indication of a receiver DC offset.

9. The method of claim 1, wherein said two consecutive OFDM symbols are data symbols.

10. The method of claim 1, wherein said two consecutive OFDM symbols are Long Training symbols.

11. The method of claim 2, wherein said DC offset estimate is removed from said received signal prior to a fast fourier transformation of said received signal.

12. The method of claim 2, wherein said DC offset estimate is removed from said received signal after a fast fourier transformation of said received signal.

13. The method of claim 1, wherein said DC offset estimate is computed utilizing an averaging algorithm based on previous DC offset estimates.

14. The method of claim 1, wherein said DC offset estimate is computed utilizing an integration algorithm based on previous DC offset estimates.

15. The method of claim 2, wherein said DC offset estimate is computed in a feedback configuration, following said removing step.

16. The method of claim 2, wherein said DC offset estimate is computed in a feed-forward configuration, prior to said removing step.

17. system for estimating a direct current (DC) offset distortion of a received signal in a receiver, comprising:
   means for computing sum of time domain frequency-compensated samples for each of two consecutive Orthogonal Frequency Division Multiplexing (OFDM) symbols;
   means for subtracting one of said sums of time domain frequency-compensated samples from another of said sums of time domain frequency-compensated samples; and
   means for obtaining said offset estimate from said subtracting step.

18. The system of claim 17, further comprising means for removing said DC offset estimate from said received signal.

19. A method for estimating a direct current (DC) offset distortion of a known transmitted Orthogonal Frequency Division Multiplexing (OFDM) symbol received over a channel, comprising the steps of:
   obtaining an estimate of said channel:
   computing a frequency domain representation of a received version of each of two known OFDM symbols received by said receiver;
   adjusting at least one of said known transmitted OFDM symbols and said frequency domain representations of said received version of said known OFDM symbols to compensate for said channel estimate; and
   subtracting one of said frequency domain representations from another of said frequency domain representations.

20. The method of claim 19, further comprising the step of removing said DC offset estimate from said received signal.

21. The method of claim 19, wherein said computing step provides an indication of a receiver DC offset.

22. The method of claim 19, wherein said known transmitted OFDM symbol comprises at least one Long Training symbol.

23. The method of claim 19, wherein said DC offset estimate is computed utilizing an averaging algorithm based on previous DC offset estimates.

24. The method of claim 19, wherein said DC offset estimate is computed utilizing an integration algorithm based on previous DC offset estimates.

25. The method of claim 19, wherein said DC offset estimate is computed in a feedback configuration.

26. The method of claim 19, wherein said DC offset estimate is computed in a feed-forward configuration.

27. A system for estimating a direct current (DC) offset distortion of a known transmitted Orthogonal Frequency Division Multiplexing (OFDM) symbol received over a channel, comprising:
   means for obtaining an estimate of said channel;
   means for computing a frequency domain representation of a received version of each of two known OFDM symbols;
   means for adjusting at least one of said known transmitted OFDM symbol and said frequency domain representations of said received version of said known OFDM symbols to compensate for said channel estimate; and
   means for subtracting one of said frequency domain representations from another of said frequency domain representations.

28. The system of claim 27, further comprising the step of removing said DC offset estimate from said received signal.

* * * * *